United States Patent Office 3,518,491
Patented June 30, 1970

3,518,491
REVERSE POWER FLOW DETECTOR
Clifford L. Downs, Lenox, Mass., assignor to General Electric Company, a corporation of New York
Filed Jan. 29, 1968, Ser. No. 701,418
Int. Cl. H02h 3/26
U.S. Cl. 317—33                7 Claims

ABSTRACT OF THE DISCLOSURE

A solid state, reverse power flow detector which samples the line voltage and current, once each cycle. The voltage sampling circuit includes a pulse generator providing a voltage pulse of short duration at a given time or phase angle in each cycle. The voltage and current signals are applied to a pair of NOR logic gates so that when the voltage pulse coincides with the current signal one gate will have an output. When the pulses do not coincide, the other gate will have an output. The output from the logic gates is used to set or reset a bistable multivibrator which acts as an output driver stage. In the disclosed circuit, reverse power flow sets the bistable multivibrator to energize a relay to thereby indicate such reverse power flow.

BACKGROUND OF THE INVENTION

This invention relates to a reverse power flow detector and more particularly to a solid state reverse power flow detector.

Present day reverse power flow detectors make use of relay type devices, which, in general, lack sensitivity and do not provide desired maintenance free life. It has been considered necessary in the electrical energy field to provide a more sensitive reverse power flow detector for use in the multiple application of electrical energy present in the field today. Further, it has been seen as a necessity in the electrical energy field to provide a reverse power flow detector which would be able to function over long periods of time without requiring extensive attention or maintenance.

Therefore, it is one object of this invention to provide a reverse power flow detector which will be responsive to small increments of reverse power flow.

A further object of this invention is to provide a reverse power flow detector which will require little maintenance and have a long life.

A still further object of this invention is to provide a reverse power flow detector which utilizes substantially solid state components.

SUMMARY OF INVENTION

Briefly, in one form, this invention comprises a voltage sampling circuit in the form of a pulse generator and a current sampling circuit. The pulse generator provides an output pulse of short duration at a given time during each cycle. The voltage and current signals are applied to a signal comparison circuit. When the signals are in coincidence, the signal comparison circuit provides an output which will not actuate a signal device. When the signals are in coincidence, the signal comparison circuit provides an output which will not actuate a signal device. When the signal comparison circuit detects a difference in polarity of the applied signals it will provide an output which will actuate a signal device to thereby indicate reverse power flow.

The invention which is sought to be protected will be particularly pointed out and distinctly claimed in the claims appended hereto. However, it is believed that this invention and the manner in which its various objects and advantages are obtained as well as other objects and advantages thereof will be more fully understood from reference to the following detailed description of a preferred embodiment thereof, particularly when considered in the light of the accompanying drawing.

DESCRIPTION OF PREFERRED EMBODIMENT

Figure 1:
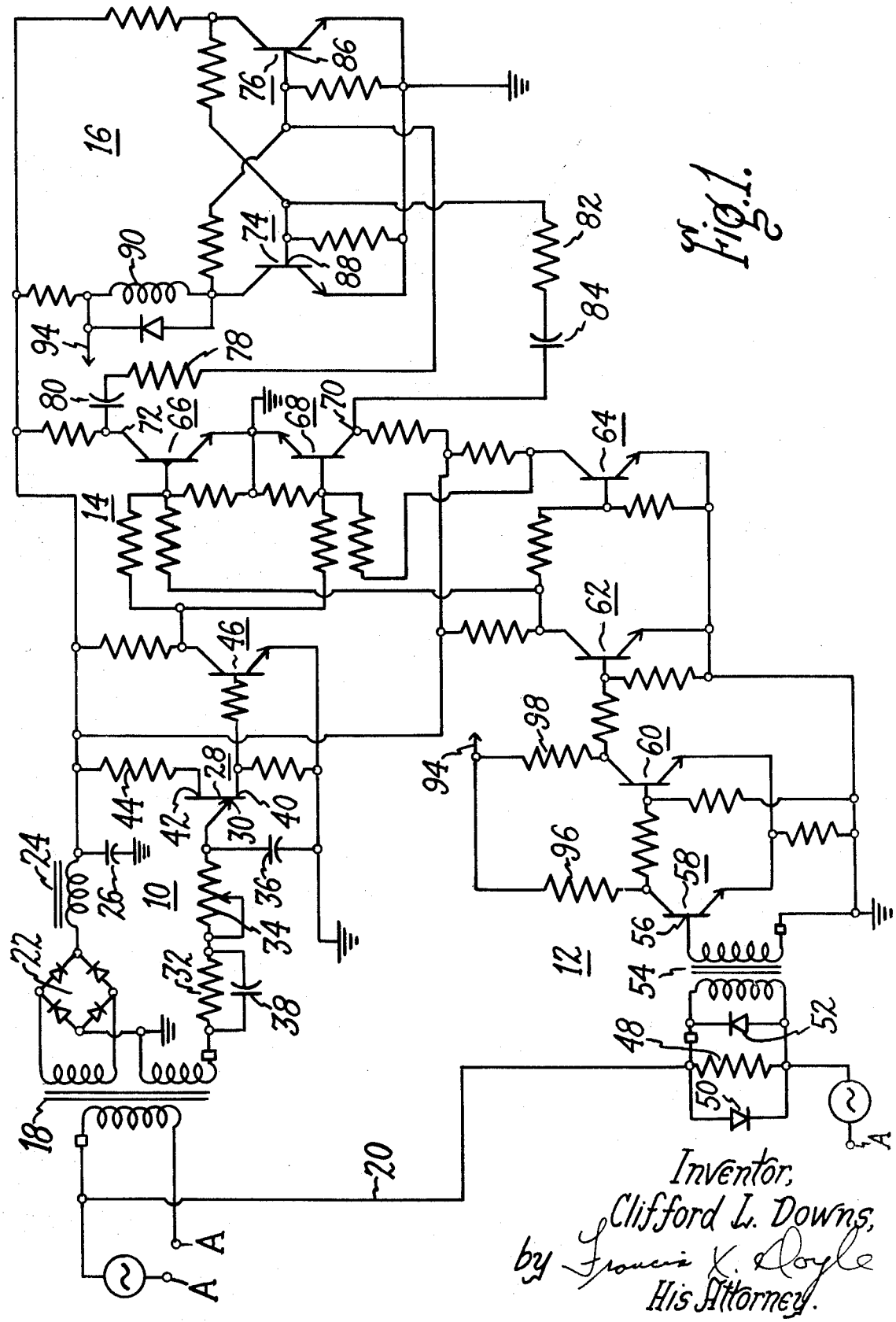
FIG. 1 is a schematic diagram of a preferred form of solid state reverse power flow detector according to this invention.
Figure 2:
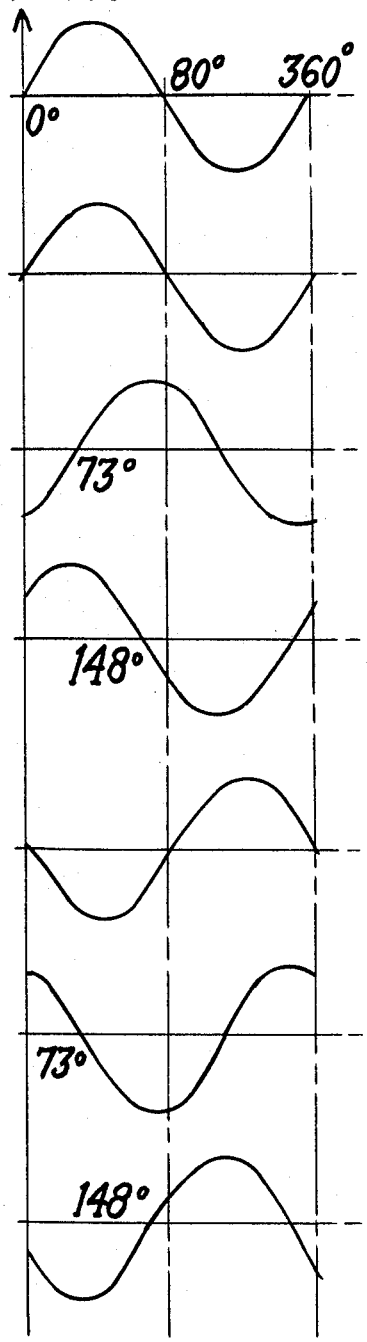
FIG. 2 shows various wave forms which illustrate the typical relationships between voltage and current signals in a power line.

FIG. 1 shows a schematic diagram of a reverse power flow detector which, essentially, makes use of solid state components. The operation of the reverse power flow detector is based on the relationship of the voltage and current signals obtained from the monitored line. FIG. 2 wave forms illustrate some typical relationships of these voltage and current signals. As can be seen from these waveforms, the current signal is always positive with forward power flow and always negative with reverse power flow between the 73° and the 148° intervals of the voltage signal. This relationship is true for all power factors between 0.3 lagging and 0.85 leading. The reverse power flow detector of this invention samples the current during the 73° to 148° interval, determines its polarity and thus determines the direction of power flow in the monitored line. The reverse power flow detector will operate over the greatest range of power factors if the sampling is done at 90°, as will be apparent from the preceding wave forms.

Referring now to FIG. 1, the schematic diagram of the preferred form of this invention shows a reverse power flow detector which includes a voltage sampling circuit, generally indicated as 10, a current sampling circuit generally indicated as 12, a signal comparison circuit, indicated as 14 and an output circuit, indicated as 16. The voltage sampling circuit comprises a transformer which is connected to the line 20 to be monitored. Transformer 18 isolates the voltage sampling circuit 10 and provides the voltage for the DC supply and the voltage sampling circuit. DC power for all stages of the reverse power flow detector is developed by means of a bridge rectifier 22, a filter inductor 24 and a filter capacitor 26 connected as shown to a secondary winding of the transformer 18.

The voltage sampling circuit 10 includes a voltage reference pulse generator 28, which is a unijunction transistor, for generating a voltage reference signal. The emitter 30 of unijunction transistor 28 is connected to the line 20 through another winding of transformer 18. One pulse per cycle is obtained from the unijunction transistor 28. The pulse is obtained during the half cycle when the voltage of emitter 30 is positive with respect to the circuit ground. The time during the half cycle in which the pulse is obtained is determined by the time constant of the integrator circuit consisting of resistors 32, 34 and the capacitor 36. A second capacitor 38 may be connected in parallel relation with the resistor 32 to shift the phase of the voltage applied to emitter 30 of unijunction transistor 28. This makes it easier to obtain a voltage reference pulse at 90° of the line voltage.

The pulse obtained from base one 40 of the unijunction transistor 28 is of very short duration, such as for example, 10 microseconds. The base two 42 of unijunction transistor 28 is preferably connected to the DC supply through a temperature compensating resistor 44. Since the DC supply is obtained through the same source as the emitter voltage, large variations can occur in the line voltage without affecting the phase angle at which the voltage reference pulse is generated. The voltage reference pulse is amplified, shaped and inverted by the transistor invertor 46. The output of transistor 46, which is the amplified and inverted voltage reference pulse, is applied to the input of the signal comparison circuit 14, as will be more fully described as this description proceeds.

The current sampling circuit 12 includes a resistor 48 which develops the current signal. As shown, the resistor 48 is directly connected in the line 20 which is being monitored. However, as will be understood, if the line current in the monitored line 20 is too great, resistor 48 may be connected to the secondary of a current transformer which is mounted on the monitored line 20. A pair of semiconductor diodes 50, 52 are preferably connected in parallel relation about resistor 48, as shown, to limit the voltage developed across the resistor 48. As will be understood, the voltage developed across resistor 48 is in phase with the line current being monitored.

The voltage from resistor 48 is stepped up by a transformer 54 and then applied to the base 56 of a transistor 58. Transistor 58 and a second transistor 60 are arranged, as shown, as an emitter coupled binary circuit which will change the current signal wave form from sinusoidal to rectangular. Transistors 58 and 60 also serve to determine the minimum current level at which reverse flow may be detected or sensed. A second pair of transistors 62, 64 are connected to receive the current signal from transistor 60, invert such signal and apply it to the input of the signal comparison circuit 14.

The signal comparison circuit 14 includes a pair of transistors 66, 68, each of which is connected to form a NOR logic gate. With the NOR configuration employed in this circuit, a positive output will be obtained from either transistor 66 or transistor 68 only when all the inputs to the stage are at zero or substantially zero volts. Since both the voltage reference pulse and the current signal are each applied to the transistors 66 and 68 it will be apparent that a positive output can only be obtained during the duration of the voltage reference pulse. At this time the voltage reference pulse will be of the same polarity as the current signal applied to either gate 66 or gate 68.

When forward power flows in the line 20, the current signal input to transistor 66 will be positive and the input to transistor 68 will be zero. When the voltage reference pulse occurs it will apply a zero voltage signal to both transistors 66 and 68. Since the voltage reference pulse at this point will coincide in polarity with the current signal applied to transistor 68, the input to transistor 68 will be zero. Therefore, an output pulse will be obtained at the collector 70 of transistor 68. Conversely, if there is a reverse flow, the current signal input to transistor 66 will be zero and the current signal input to transistor 68 will be positive. When the voltage reference pulse occurs, it will apply a zero voltage input to each of transistors 66 and 68. Since at this time it will coincide in polarity with the current signal applied to transistor 66, the input to transistor 66 will be zero, and an output pulse will be obtained at the collector 72 at the transistor 66. Thus, as will be apparent, when there is forward power flow, an output signal will be obtained from the transistor 68, whereas when reverse power flows in line 20 an output will be obtained from transistor 66.

The output from the signal comparison circuit 14 is applied to the output circuit 16 which, as shown, is in the form of a bistable multivibrator comprising transistors 74 and 76. The bistable multivibrator serves as a memory and also as the output driver stage of the reverse power flow detector. A resistor 78 and a capacitor 80 form a coupling stage between transistor 66 of the signal comparison circuit and transistor 76 of the bistable multivibrator, while the resistor 82 and capacitor 84 form the coupling network between transistor 68 of the signal comparison circuit 14 and the transistor 74 of the bistable multivibrator. As is shown, each of the coupling networks is connected to the collector 72, 70 of their respective transistor 66 and 68. The coupling networks are also connected to the bases 86 and 88 of transistors 76 and 74, respectively. As will be apparent from the drawing, a pulse from transistor 66 will turn off transistor 76 and, due to regenerative action, transistor 74 will be turned on. In a similar manner, a pulse from transistor 68 will turn off transistor 74 while transistor 76 will be turned on. The bistable multivibrator will remain in one state until triggered by the appropriate pulse to the other state. In this manner, the circuit will remember the direction of power flow during the time lapse between samples.

An output indication is obtained from the output circuit 16 by means of a relay 90. The relay 90 serves as the collector load for the transistor 74 of the bistable multivibrator, as shown. As will be understood with reverse power flow in the line 20 a pulse will be obtained from transistor 66 which will turn off transistor 76 of the bistable multivibrator, thereby causing transistor 74 to turn on. When transistor 74 turns on, relay 90 will be energized to thereby indicate reverse power flow in line 20. When there is either forward flow or zero flow in the line 20, then a signal will be applied from transistor 68 in the signal comparison circuit 14 to transistor 74 in the bistable multivibrator, thereby turning off transistor 74, and deenergizing coil 90.

In circuit indicated in the figure, a feedback may be provided by means of resistor 92 and lead 94 to the binary circuit in the current signal generator 12, as is indicated by line 94 in the current signal circuit. This positive feedback will insure a clean circuit decision. During forward power flow, transistor 74 is off, and the voltage drop across resistor 92 is due only to the current drawn by transistor 58 or 60. However, when reverse power flow occurs, transistor 74 is turned on thereby increasing the voltage drop across resistor 92. The resultant drop in the line voltages to the resistors 96, 98 will increase the sensitivity of the binary circuit comprising transistors 58 and 60, thereby providing a small amount of hysteresis in the binary circuit. As will be apparent, if it is desired to have zero flow in line 20, providing an indication of reverse flow the polarty of the secondary winding in transformer 54 may be reversed.

While there has been shown and described the present preferred embodiment of the invention, it will be clear to those skilled in the art that various changes may be made in the circuit detail without departing from the scope of the invention. As will be apparent, an output indication to provide an indication of reverse flow may be provided by utilizing the signal from the transistors 74, 76 in the bistable multivibrator to drive other circuitry than the relay coil 90. Also, as may be apparent, the relay coil could be connected to the other transistor 76 whereby the energizing of coil 90 would indicate forward power flow, while the deenergizing of the coil would indicate reverse power flow. Thus it will be apparent that changes may be made without departing from the spirit and scope of this invention.

What is claimed as new and which it is desired to secure by Letters Patent of the United States is:

1. A reverse power flow detector utilizing solid state components comprising:
  (a) a voltage sampling circuit for generating a voltage signal including a voltage reference pulse generator connected to the line to be monitored.
  (b) a current sampling circuit for generating a current signal including a binary stage for shaping said current signal,
  (c) a signal comparison circuit, said signal comparison circuit connected to receive the output of the voltage sampling circuit and the current sampling circuit,
    (1) said signal comparison circuit providing a first output signal when said voltage and current signals are of the same polarity and providing a second output signal when said voltage and current signals are of opposite polarity, (d) and an output circuit actuated by said second signal to indicate reverse power flow.

2. A reverse power flow detector as claimed in claim 1, in which said voltage reference pulse generator is a unijunction transistor, the emitter of said transistor having means for connecting it to a power line, said means including a resistor-capacitor integrator circuit.

3. A reverse power flow detector as claimed in claim 2 in which said signal comparison circuit includes a pair of logic gates, one of said logic gates receiving the output of said voltage sampling circuit and said current sampling circuit and the other of said logic gates receiving the output of said voltage sampling circuit and an inverted output of said current sampling circuit.

4. A reverse power flow detector using solid state components comprising:
   (a) a voltage sampling circuit, said voltage sampling circuit including a transistorized voltage reference pulse generator,
   (b) a current sampling circuit, said current sampling circuit including a transistorized binary circuit for shaping the current signal.
   (c) a signal comparison circuit, said signal comparison circuit including a pair of logic gates,
       (1) one logic gate receiving the output from said voltage sampling circuit and said current sampling circuit,
       (2) the other logic gate receiving the output from said voltage sampling circuit and an inverted output from said current sampling circuit,
   (d) and an output circuit, said output circuit connected to receive an output signal from said pair of logic gates, said output circuit providing a signal when receiving an output from said other logic gate.

5. A reverse power flow detector as set forth in claim 4 in which said current sampling circuit includes a resistor connected to the power line to develop a current signal, said developed signal being in phase with the current in the power line.

6. A reverse power flow detector as set forth in claim 5 in which said output circuit is a transistorized bistable multivibrator, and the output from said one logic gate sets said bistable multivibrator in one state and the output from said other logic gate setting said bistable multivibrator in a second state.

7. A reverse power flow detector as set forth in claim 4 in which said voltage reference pulse generator is a unijunction transistor, the emitter of said transistor having means for connecting said emitter to a power line.

References Cited

UNITED STATES PATENTS 3,396,310   8/1968   Logan _____ 317—43 X
3,417,293   12/1968  Peaslee et al. _____ 317—43

JAMES D. TRAMMELL, Primary Examiner

U.S. Cl. X.R.
307—127; 317—43